(12) United States Patent
Singhai et al.

(10) Patent No.: US 9,575,669 B2
(45) Date of Patent: Feb. 21, 2017

(54) PROGRAMMABLE SOLID STATE DRIVE CONTROLLER AND METHOD FOR SCHEDULING COMMANDS UTILIZING A DATA STRUCTURE

(71) Applicant: HGST Netherlands B.V., Amsterdam (NL)

(72) Inventors: Ashish Singhai, Los Altos, CA (US); Kenneth Alan Okin, San Jose, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 142 days.

(21) Appl. No.: 14/564,829

(22) Filed: Dec. 9, 2014

(65) Prior Publication Data

US 2016/0162202 A1 Jun. 9, 2016

(51) Int. Cl.
*G06F 3/06* (2006.01)
*G06F 11/07* (2006.01)

(52) U.S. Cl.
CPC .......... *G06F 3/0613* (2013.01); *G06F 3/0659* (2013.01); *G06F 3/0688* (2013.01); *G06F 11/073* (2013.01);
(Continued)

(58) Field of Classification Search
CPC .................. G06F 12/0246; G06F 2212/2022; G06F 2212/7208; G06F 2212/72; G06F 13/1668; G06F 3/0679; G06F 3/0613; G06F 3/0658; G06F 3/0659; G06F 3/0685; G06F 3/0688; G06F 11/073; G06F 11/0793; G06F 11/0751
See application file for complete search history.

(56) References Cited

U.S. PATENT DOCUMENTS 8,055,816 B2 * 11/2011 Asnaashari .......... G06F 13/161
710/21
8,595,411 B2 11/2013 Selinger et al.
(Continued)

FOREIGN PATENT DOCUMENTS

CN 203102265 U 7/2013

OTHER PUBLICATIONS

Liu et al, "Commands Scheduling Optimized Flash Controller for High Bandwidth SSD Application," 2012 IEEE International Conference on Solid-State and Integrated Circuit Technology, Oct. 29-Nov. 1, 2012, pp. 1-3.*
(Continued)

*Primary Examiner* — Yong Choe
*Assistant Examiner* — Glenn Gossage
(74) *Attorney, Agent, or Firm* — Wilmer Cutler Pickering Hale and Dorr LLP

(57) ABSTRACT

A memory controller and method for scheduling commands in a memory controller are disclosed. A programmable solid state drive (SSD) controller and a non-volatile memory apparatus are provided. Data structures, termed "Superbufs" are utilized for organizing internal activities in the SSD controller. Each data structure can comprise a host command area, a command area, and a notes or scratch pad area. A memory controller can be configured to, upon receiving a host command, copy the original received host command into the host command area of a first data structure, generate a first command group, copy the first command group into the command area, and execute commands of the first command group. A data structure can be initialized to an idle state, and can transition to other states such as a new command received state, a read for execution state, a command group complete state and an error state.

20 Claims, 5 Drawing Sheets

206

(52) U.S. Cl.
CPC ....... *G06F 11/0751* (2013.01); *G06F 11/0793* (2013.01)

(56) References Cited

U.S. PATENT DOCUMENTS

| | | |
|---|---|---|
| 8,700,834 B2 | 4/2014 | Horn et al. |
| 8,751,700 B2 | 6/2014 | Asnaashari et al. |
| 2012/0011334 A1 | 1/2012 | Han et al. |
| 2013/0060981 A1* | 3/2013 | Horn ................. G06F 13/16 710/107 |
| 2013/0086311 A1* | 4/2013 | Huang ............. G06F 13/1689 711/103 |
| 2013/0139035 A1 | 5/2013 | Zhong et al. |
| 2013/0254455 A1 | 9/2013 | Shim et al. |
| 2014/0331001 A1* | 11/2014 | Liu ................... G06F 3/0659 711/103 |
| 2015/0212755 A1* | 7/2015 | Asnaashari ........ G06F 3/0629 711/103 |

OTHER PUBLICATIONS

Nam et al, "Ozone (O3): An Out-of-Order Flash Memory Controller Architecture," IEEE Transactions on Computers, vol. 60, No. 5, May 2011, pp. 653-666.*

Renjith, G. et al., "Reliable Hydra SSD Architecture for General Purpose Controllers," International Journal of Modern Engineering Research (IJMER), vol. 4, Issue 2, pp. 1-7 (Feb. 2014).

* cited by examiner

PROGRAMMABLE SOLID STATE DRIVE CONTROLLER AND METHOD FOR SCHEDULING COMMANDS UTILIZING A DATA STRUCTURE

FIELD OF THE DISCLOSURE

The present disclosure relates to systems and methods for a programmable, high performance solid-state drive (SSD) controller architecture.

RELATED DISCLOSURE

Solid-state drive (SSD) controllers need to be flexible to adapt to a variety of host bus protocols, for example, the Serial Attached SCSI (SAS) and Non-Volatile Memory Express® (NVMe) protocols, and a variety of memory bus protocols, such as the Open NAND Flash Interface (ONFI2), ONFI3, and Toggle®. In addition, it is desirable for SSD controllers to be flexible to perform or help the implementation of data services such as compression, encryption, remote replication, and recovery. All those services must be delivered with high performance under a resource-constrained environment. SSD controllers typically operate under limited power, limited processing resources, and limited memory environment.

Prior art solutions to these problems either sacrifice performance or flexibility. Therefore there is a need for an SSD controller that can adapt to a variety of host bus and memory protocols, and implement various data services without sacrificing performance or flexibility.

SUMMARY

Systems and methods for designing a programmable solid state drive (SSD) controller and a non-volatile memory apparatus are provided. The disclosed systems and methods utilize data structures, termed "superbufs" for organizing internal activities in an SSD controller. Superbufs can be used for scheduling command execution, providing control flow services, such as, sequencing, synchronization, completion, and interrupt generation, as well as data flow services, for example, data transfer, data transformation, and data distribution.

According to aspects of the present disclosure a method for scheduling commands in a memory controller is provided. The method includes providing a plurality of data structures, wherein each data structure can include a host command area, a command area, and a notes area. The method can include receiving, by a memory controller, a host command from a host in communication with the memory controller and copying the received host command into the host command area of a first data structure. The method can also include generating a first command group in response to the received host command, wherein the first command group comprises a command for execution by an execution unit of the memory controller, copying the first command group into the command area of the first data structure, and executing the command of the first command group.

According to aspects of the present disclosure a memory controller can comprise a controller module configured to provide a plurality of data structures, wherein each data structure can include a host command area, a command area, and a notes area. The controller module can be configured to receive a host command by a host in communication with the memory controller and copy the received host command into the host command area of a first data structure. The controller module can also be configured to generate a first command group in response to the received host command, wherein the first command group comprises a command for execution, and copy the first command group into the command area of the first data structure. The memory controller can also comprise an execution unit configured to execute the command of the first command group.

BRIEF DESCRIPTION OF THE DRAWINGS

Various objects, features, and advantages of the present disclosure can be more fully appreciated with reference to the following detailed description when considered in connection with the following drawings, in which like reference numerals identify like elements. The following drawings are for the purpose of illustration only and are not intended to be limiting of the invention, the scope of which is set forth in the claims that follow.

DETAILED DESCRIPTION

Systems and methods for designing a programmable solid-state drive controller and a non-volatile memory apparatus are provided. The disclosed systems and methods use data structures, termed "superbufs" that are used to organize internal activities in an SSD controller. Superbufs can represent control flow services, for example, sequencing, synchronization, completion, and interrupt generation, as well as data flow services, for example, data transfer, data transformation, and data distribution. The disclosed superbufs can help minimize latencies, increase parallelism, manage resources, and increase efficiency, for example, by requiring less memory and central processing unit (CPU) resources, within systems that implement communication protocols.

Figure 1:
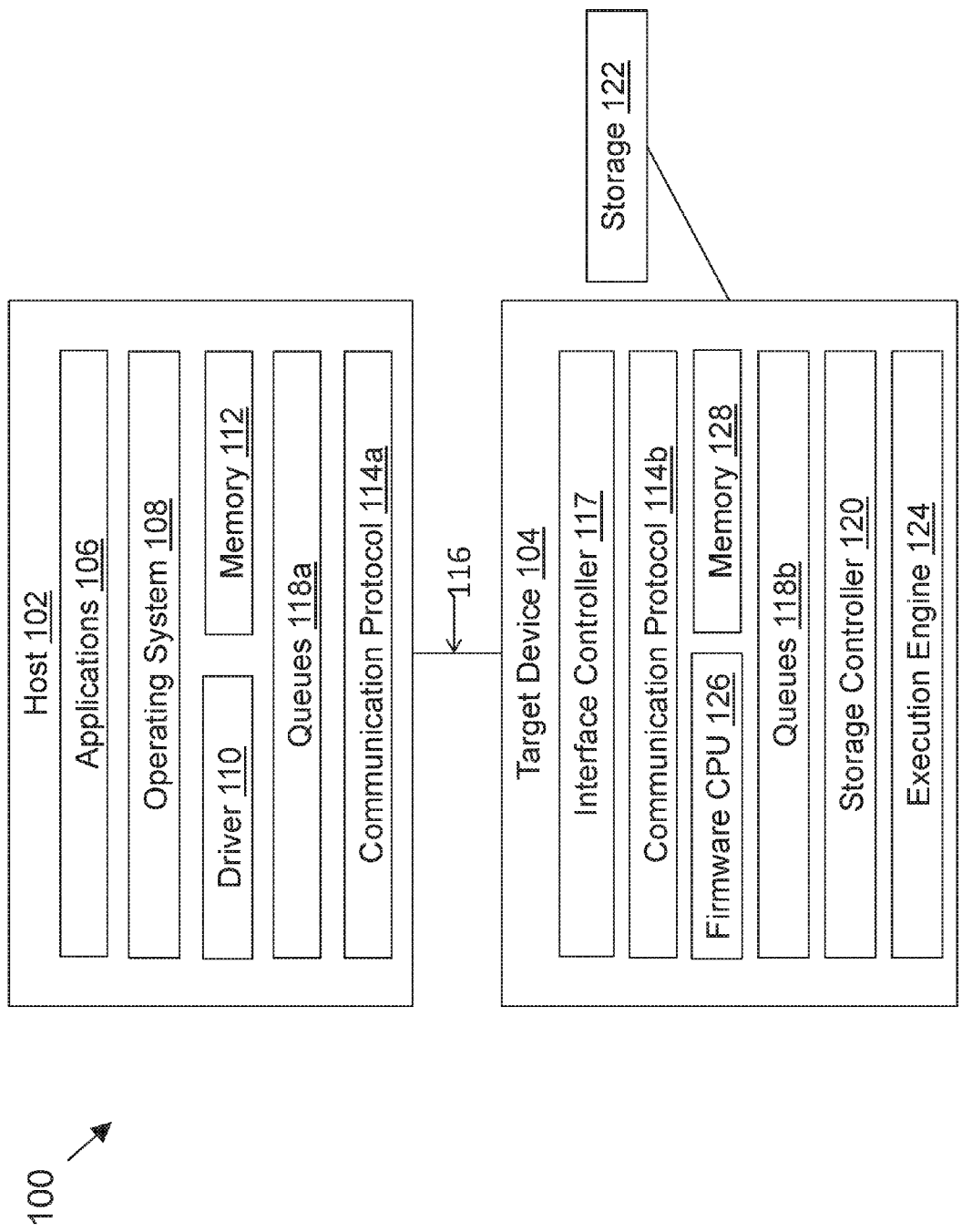
FIG. 1 illustrates an exemplary system implementing a communication protocol according to aspects of the present disclosure.

FIG. 1 shows an illustrative system 100 implementing a communication protocol, in accordance with some embodiments of the present disclosure. System 100 includes host 102 in communication, through communication medium 116, with target device 104, and storage 122. Host 102 includes user applications 106, operating system 108, driver 110, host memory 112, queues 118a, and communication protocol 114a. Target device 104 can include interface controller 117, communication protocol 114b, a firmware CPU 126, target device memory 128, queues 118b, storage controller 120 in communication with storage 122, and an execution engine 124.

Target device 104 can communicate with host 102 using interface controller 117 and communication protocol 114b. Communication protocol 114b can utilize queues 118 to access storage 122 via storage controller 120. According to aspects of the present disclosure, data flows from the host memory 112, and eventually into storage 122, and vice versa. A person of ordinary skill will understand that communication protocols 114a and 114b can be two parts of a single communication protocol.

A solid-state drive controller can be responsible for handling application input/output (IO) requests, for example, a read request. Handling a read request by the SSD controller can require various steps. For example, handling a read request can require translating the requested address into one or more storage media address(es). Depending on the data layout, each requested address may require addressing multiple independent storage media elements, for example, multiple NAND flash chips.

Handling a read request can additionally require issuing requests to the storage media and collecting responses from the storage media. If there are multiple storage media elements, each storage media element can potentially generate one or more responses. If the SSD controller receives more than one response from the storage media, it may need to aggregate these responses into one host-visible response, before transmitting the response to the host.

Read requests can also require transferring data retrieved from the media elements to the host memory. The SSD controller can collect the data from the media elements and might need to break the data into multiple chunks or packets depending, for example, on the destination address specification, e.g., a scatter gather list, the intervening bus characteristics, e.g., peripheral component interconnect (PCI) Express, or the length of the data that needs to be transmitted to the host memory.

Read requests can also require recovering from exception conditions. If any exception conditions occur while handing the request, the SSD controller may need to take further actions to recover from these conditions and avoid future occurrences of these exception conditions. For example, failure of one of the media elements to return data would necessitate data recovery using redundancy mechanisms, such as parity-based mechanisms, or erasure codes.

According to aspects of the present disclosure, an SSD controller, for example storage controller 120, can be structured as a front-end and a back end. The front-end of the SSD controller can comprise, for example, interface controller 117 and communication protocol 114b. The front-end can interface with host 102, using communication protocols 114a and 114b, through medium 116. The back end of the SSD controller can include, for example, the execution engine 124 and can interface with the storage media, for example, storage 122. According to aspects of the present disclosure, the front-end receives commands originated from the host and constructs a data structure, termed "superbuf," representing each host command, and presents the superbuf to the back-end for execution. According to aspects of the disclosure, a superbuf can be stored in target device memory 128 and firmware CPU 126 can retrieve and store the superbuf from memory 128. Firmware CPU 126 can be responsible for adding information, for example, commands for execution, in the superbuf as discussed below. The back-end can be thought of as a superbuf execution engine that executes the instructions contained in each presented superbuf. The front-end can be constructed entirely using hardware logic or can be constructed using a combination of hardware and firmware. In practice, the use of firmware allows greater flexibility.

Figure 2:
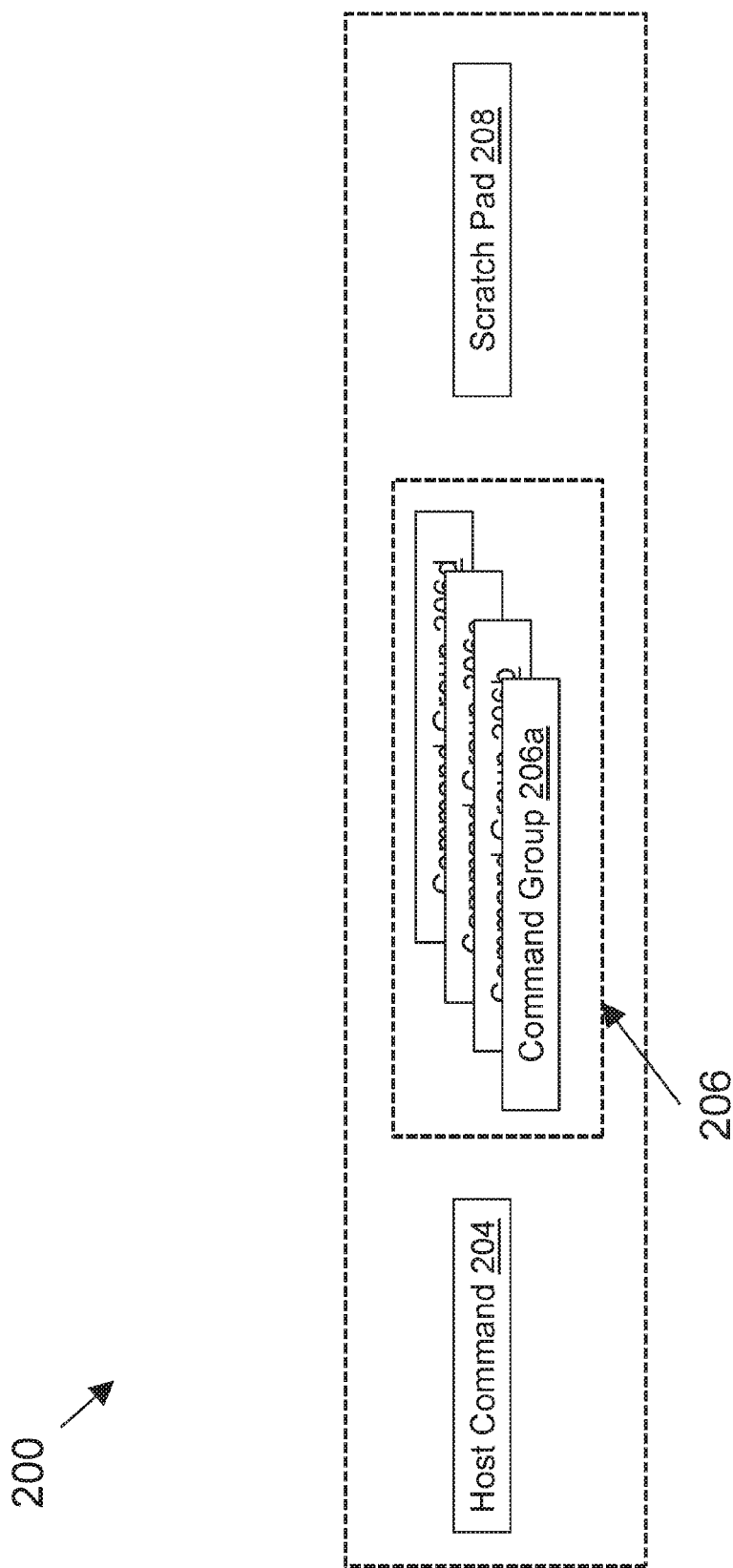
FIG. 2 illustrates an exemplary superbuf structure according to aspects of the present disclosure.

According to aspects of the present disclosure, each superbuf can be represented by a data structure comprising at least three elements: (1) the original host command area, (2) a command groups area, and (3) a scratch pad area. FIG. 2 shows an exemplary superbuf structure 200 according to aspects of the present disclosure. Specifically, FIG. 2 shows superbuf structure 200 with a host command area 204, a command groups area 206, and a scratch pad area 208. The command groups area 206 shown in FIG. 2, is illustrated to include four command groups 206a-d. A person of ordinary skill would understand that the number of command groups in a superbuf can be arbitrarily large. According to aspects of the disclosure, the number of command groups in a superbuf can depend on the depth of the command processing pipeline.

The front-end can investigate each incoming host command and can copy it into the original host command area of a superbuf for reference. Copying the original host command into the superbuf can be useful, for example, for debugging and/or logging purposes, and for handing off the superbuf to an independent controller. In addition, if the commands in a particular superbuf failed to execute or complete, a different superbuf may be required. In this case, it can be useful to refer to the incoming host command stored in the host command area 204. According to alternative aspects, the front-end does not copy the original host command into the superbuf. The front-end can generate some of the command sequences and can place them in the appropriate command groups in the command groups area.

The scratch pad 208 can be used for collecting information about the superbuf. According to aspects of the present disclosure, information collected in the scratch pad is not relevant to hardware functions, but can be relevant to firmware functions, for example bookkeeping and statistics gathering. For example, the scratch pad can include operation start times, start and end times of superbuf state transitions, count of repeat attempts at performing an operation, and pointers. Finally, the front-end can deliver the superbuf to the back-end of the SSD controller for execution.

The command groups area 206 can contain commands for execution. Specifically, in response to the received host commands, the firmware can package commands into the command groups area. The commands in the command groups area of each superbuf can be a sequence of commands that are appropriate for fast and efficient execution by the hardware, for example, the execution engine 124. Commands in each command group can be executed in parallel and no commands in a group will start execution until all commands in the previous group have been successfully executed. Thus, command groups provide fork-and-join semantics for each original host command. For example, for a particular command group, the semantics can include information about forking, i.e., branching out to multiple parallel activities within the command group and information about joining, i.e., waiting for the multiple activities to complete before starting execution of another command group. This construct can be useful for creating high throughput commands that can operate on multiple storage elements in parallel.

According to aspects of the disclosure, a command group can launch multiple, e.g., hundreds, of commands without requiring firmware intervention. Because these commands are executed by the hardware, the firmware does not need to oversee the issued commands, for example, track the execution, aggregate the command responses, or handle interrupts. In addition, the command groups can synchronize on command completion, i.e., when all commands in a particular group have been executed. The controller can then launch the commands of the following command group. Under this implementation, the throughput can increase by minimizing the firmware CPU 126 workload, because the commands can be executed in hardware more efficiently, compared to execution in firmware. Existing implementations use a programmable sequencer to launch multiple commands in a "channel" (or a storage element), however, they still require firmware processing to launch commands into different channels. In contrast, the disclosed methods using superbufs can sequence, launch, monitor the completion of the commands in a command group, and move to the following command group without causing any firmware overhead, because as explained above, once the commands are issued, they are executed by the hardware, and the firmware does not oversee execution. In addition, handling of the target device memory 128 is improved. As explained above, superbufs can be stored in memory 128. Accordingly, the disclosed implementation using superbufs allows "one-touch" memory handling. For example, the firmware can initially retrieve the superbuf from memory, and store it back to the memory once, only when the superbuf has completed execution.

According to aspects of the disclosure, the commands in two command groups of different superbufs can be executed in parallel. The controller can send multiple superbufs to the back end and the superbufs can be executed without any particular hierarchy.

Figure 3A:
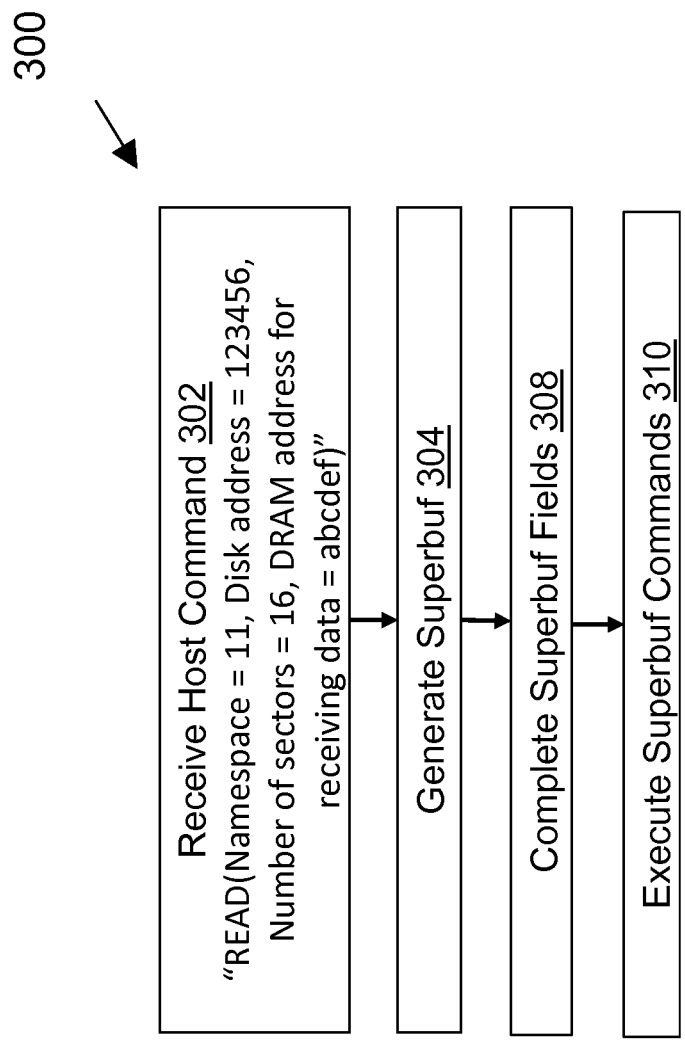
FIG. 3A illustrates an exemplary method of generating a superbuf according to aspects of the present disclosure.
Figure 3B:
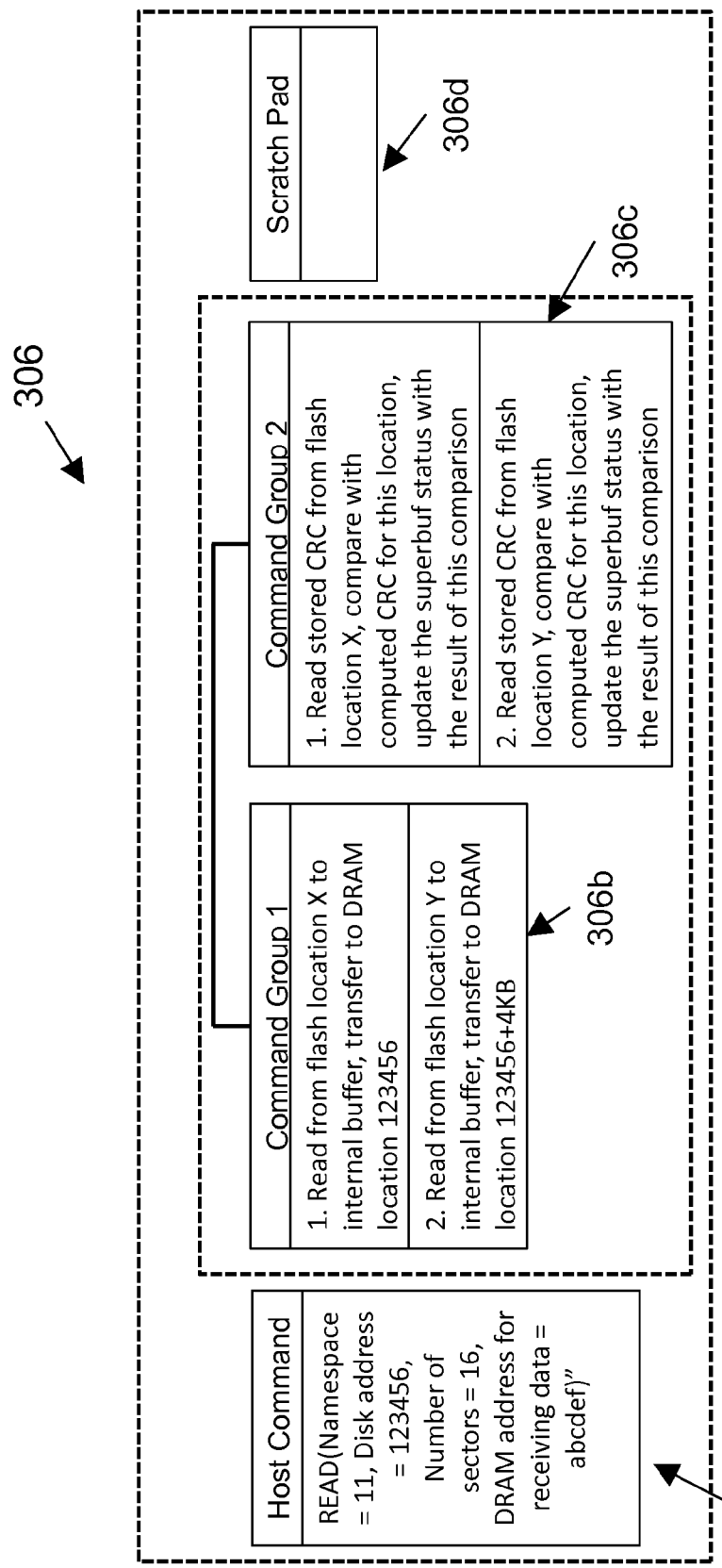
FIG. 3B illustrates an exemplary superbuf according to aspects of the present disclosure.

FIG. 3A illustrates an exemplary method 300 for generating command sequences in response to a received host command, according to aspects of the disclosure. For illustration purposes only, an exemplary host command, received at step 302, can be "READ(Namespace=11, Disk address=123456, Number of sectors=16, DRAM address for receiving data=abcdef)." In response to the received command, the front-end generates a superbuf at step 304. FIG. 3B shows superbuf 306, which is generated at step 304.

According to aspects of the disclosure, as discussed above, when the superbuf is generated, the hardware front-end can pre-fill some of the superbuf fields, for example, the host command 204 field, before handing the superbuf to the firmware. The firmware can fill the remaining superbuf fields. The discussion below illustrates how the firmware can interpret the received host command and fill the remaining superbuf fields with information that corresponds to the received host command. For example, for the particular received instruction, "Namespace 11" corresponds to protected information. Accordingly, the firmware interprets this information and performs extra checking on the read data. In addition, the firmware understands that "Namespace 11" is configured with a sector size of 512 bytes. According to the exemplary host command, the number of requested sectors is sixteen ("Number of sectors=16"), which corresponds to 16*512/1024=8 kilobytes (KB) of data. The exemplary instruction further specifies the target address in the dynamic random access memory (DRAM) for receiving the data, which in this example is "abcdef." Internal data structures in the flash memory can locate different chunks of data from NVM address locations. For example, if the internal data structures can locate 4 KB chunks of data, the requested data of size of 8 KB, can be broken into two chunks of data, of 4 KB each. Accordingly, if the data of the first chunk, is located at NVM location, "X," which in the particular example corresponds to address 123456, then the data of the second chunk, will be located at NVM location 123456+8, "Y," which would correspond to eight additional sectors of size 512 bytes, or 8*512=4 KB. Accordingly, the 4 KB of data from NVM location X should go to DRAM address "abcdef," while the 4 KB of data from NVM location Y should go to DRAM address "abcdef+4 KB."

The front-end hardware can pre-fill the original command into the superbuf in the original host command area 306a (FIG. 3B), for example, at step 304 (FIG. 3A), when the superbuf is generated. The various command group superbuf fields can be appropriately filled by the front-end hardware or the firmware, for example, as shown in step 308. Specifically, for the particular example, assuming the superbuf has two command groups 306b and 306c, as shown in FIG. 3B, a template and DRAM transfer commands of the first command group can be pre-filled by the front-end, while the NVM locations can be filled by the firmware. The first command group 306b can contain, for example, two commands, e.g., a first command "Read from flash location X to internal buffer, transfer to DRAM location abcdef," and a second command "Read from flash location Y to internal buffer, transfer to DRAM location abcdef+4 KB". The second command group 306c can include two additional commands, for example, a first command "Read stored CRC from flash location X, compare with computed CRC for this location, update the superbuf status with the result of this comparison," and "Read stored CRC from flash location Y, compare with computed CRC for this location, update the superbuf status with the result of this comparison." The scratch pad area 306d can contain additional information, not shown in FIG. 3B, as discussed above.

Once the superbuf is filled, the back-end executes the instructions with the command groups at step 310 (FIG. 3A). According to aspects of the present disclosure, instructions within a command group are launched in parallel. For example, the two commands in the first command group 306b can be executed in parallel. All instructions within a command group should successfully finish before launching the next stage. For example, both commands in the first command group 306b finish before launching the commands in the second command group 306c. If all available command groups are executed successfully then an NVMe host response is generated and an interrupt issued, in accordance with the protocol. If there is an error at any stage, no host response is generated, the superbuf status can show which stage had the error, and the firmware is expected to handle the error cleanup, for example, by issuing another superbuf.

The superbuf execution engine can have internal scoreboarding mechanisms to track the state of each superbuf. Persons of ordinary skill would understand that a scoreboard in this context can be a hardware construct that can be modeled as a table with dependencies among cells in the table. Each cell can track the detailed state of an internal execution unit and can issue different instructions to it as the dependencies are met. For example, the state of each superbuf can be provided in a special register area, so the firmware can track the progress of each superbuf, as well as the exception conditions associated with it. An exception condition can happen, for example, when one of the many storage elements read in parallel does not return data. This can be caused, for example, because of an error in the storage element. In such a case, the superbuf state can become "Needs Attention" or "Error," as explained in more detail below, and the firmware is notified, which in turn goes through an error recovery routine. Another example of an exception condition is a malformed command, for example, when the initial command parser that creates the superbuf copies the command to the command area and then queues it for firmware attention while setting the status as error. In all error cases, the firmware can perform error recovery and notification to the host if needed. As a superbuf moves from one state to another through the various internal functional units of the execution engine, the superbuf state can be updated in the register area. The firmware can be notified of state changes via interrupts and messages on a superbuf attention queue.

Figure 4:
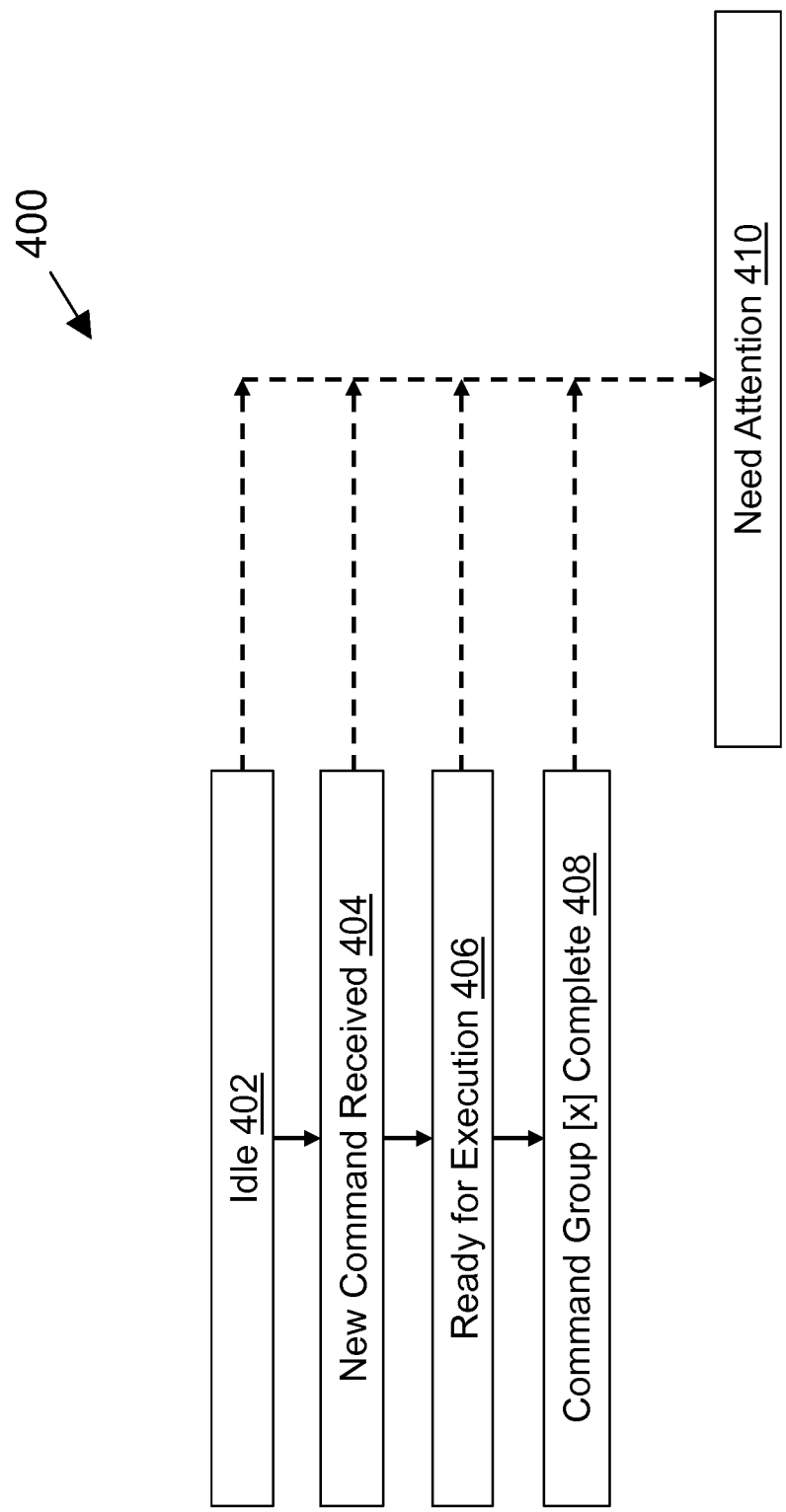
FIG. 4 illustrates exemplary states of a superbuf according to aspects of the present disclosure.

According to aspects of the present disclosure, the superbufs can be in and move between different states, as shown in FIG. 4, generally at 400. As various entities, such as the front-end or the superbuf execution engine, work on a superbuf, the superbuf can transition to a new state. For example, the superbufs can be in one of five different states.

A first state can be an "Idle" state (402). All superbufs are initialized into this state. At this state, a superbuf waits to be selected by the controller. A second state can be a "New Command Received" state (404). At this state, the front-end copies the received host command into the original host command area, and also pre-fills as many commands in the command group area as it can, as discussed in connection with the method illustrated in FIG. 3A. A third state can be a "Ready for Execution" state (406). At this state, the commands that correspond to the received host command are entered into an appropriate command group and the superbuf is submitted to the superbuf execution engine. A fourth state can be a "Command Group [x] Complete" state (408). Commands in a superbuf are submitted for execution by command group. For example, all commands in a particular command group are submitted for execution, before any command from a different command group is submitted for execution. As each command group is completed the superbuf moves to "Command Group [x] Complete" where "x" can range over the set of Command Groups. A fifth state can be a "Need Attention" or "Error" state (410). A superbuf reaches this state if the superbuf execution engine encounters an error and cannot proceed any further without help. The superbuf can enter the "Need Attention" state from any other state. Other components in the controller, typically the firmware, carry out error recovery routines. For example, it could involve retrying the entire command set by resetting the superbuf state to "Ready for execution" and resubmitting it to the superbuf execution engine.

According to aspects of the present disclosure, when a new host command arrives at the front-end, the front-end identifies a superbuf in an "Idle" state. The front-end fills the original host command area of the superbuf with the received host command, and also pre-fills the command group area to the extent possible. Then it changes the superbuf state to "New Command Received."

In this state, the front-end (typically the firmware component of the front-end) generates the corresponding back-end commands for the received host command and fills one or more command groups with the generated commands. The front-end then changes the superbuf state to "Ready for Execution" and dispatches the superbuf to one or more execution units to execute the generated commands.

As the execution engine executes each command group, it changes the superbuf state to "Command Group [x] Complete." When the final command group is completed, the superbuf is available for further action by the front-end, such as generating a completion response to the host, for example an NVMe completion entry. Subsequent to the final processing steps, the front-end changes the superbuf state to "Idle" and makes it available for future reuse.

At any point in the execution, if the superbuf execution engine encounters an error, the execution engine changes the superbuf state to "Need Attention" and sends it back to the front-end. The front-end is responsible for handling errors. During error handling, the same superbuf, perhaps in a modified form, can be resubmitted to the back-end.

The implementation of superbufs can result in a better utilization of the hardware of the SSD controller. Once a superbuf is constructed, the hardware of the SSD controller can take over the superbuf and execute the generated commands in the command group area(s) of the superbuf. Accordingly, the firmware does not need to be involved in the actual execution of the original host command, which results in a more efficient controller. For example, the firmware can only provide the logical to physical mapping on a read request, or manage other internal activities, such as, garbage collection.

The combination of the disclosed techniques leads to flexible, programmable controllers which minimum firmware involvement. In NVM controllers, firmware is typically executed using a low power, low capability CPU. Therefore, minimizing firmware involvement can result in lower processor power and consequentially low heat dissipation, cost savings by using a cheaper processor, better response time because the firmware level processing is slower than hardware level processing, better robustness because simpler firmware implies fewer bugs, and more throughput because for the same processing power, the firmware can handle more commands. The disclosed methods can be used to build PCIe (proprietary) SSDs, NVMe SSDs, and SAS SSDs using the same basic elements.

Those of skill in the art would appreciate that the various illustrations in the specification and drawings described herein can be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware, software, or a combination depends upon the particular application and design constraints imposed on the overall system. Skilled artisans can implement the described functionality in varying ways for each particular application. Various components and blocks can be arranged differently (for example, arranged in a different order, or partitioned in a different way) all without departing from the scope of the subject technology.

Furthermore, an implementation of the communication protocol, e.g., the communication protocol of FIG. 1, can be realized in a centralized fashion in one computer system, or in a distributed fashion where different elements are spread across several interconnected computer systems. Many kinds of computer systems, or other apparatus adapted for carrying out the methods described herein, are suited to perform the functions described herein.

A typical combination of hardware and software could be a general purpose computer system with a computer program that, when loaded and executed, controls the computer system such that it carries out the methods described herein. The methods for the communications protocol, e.g., the communication protocol of FIG. 1, can also be embedded in a computer program product, which comprises all the features enabling the implementation of the methods described herein, and which, when loaded in a computer system is able to carry out these methods.

"Computer program" or "application" in the present context means any expression, in any language, code or notation, of a set of instructions intended to cause a system having an information processing capability to perform a particular function either directly or after either or both of the following a) conversion to another language, code or notation; b) reproduction in a different material form. Significantly, the communications protocol, e.g., the communication protocol of FIG. 1, can be embodied in other specific forms without departing from the spirit or essential attributes thereof, and accordingly, reference should be had to the following claims, rather than to the foregoing specification, as indicating the scope of the invention.

The communications protocol, e.g., the communication protocol of FIG. 1, has been described in detail with specific reference to these illustrated embodiments. It will be apparent, however, that various modifications and changes can be made within the spirit and scope of the disclosure as described in the foregoing specification, and such modifications and changes are to be considered equivalents and part of this disclosure.

What is claimed is:

1. A method for scheduling commands in a memory controller, the method comprising:
   providing, by the memory controller, a plurality of data structures, each data structure comprising:
   a host command area;
   a command area; and
   a notes area;
   receiving, by the memory controller, a host command from a host in communication with the memory controller;
   copying, by the memory controller, the received host command into the host command area of a first data structure;
   generating, by the memory controller, a first command group in response to the received host command, wherein the first command group comprises at least one command for execution by an execution unit of the memory controller;
   copying, by the memory controller, the first command group into the command area of the first data structure; and
   executing, by the execution unit of the memory controller, the at least one command of the first command group.

2. The method of claim 1, wherein the first command group comprises a first plurality of commands; and
   wherein the execution unit of the memory controller executes the first plurality of commands of the first command group in parallel.

3. The method of claim 2, further comprising:
   generating, by the memory controller, a second command group in response to the received host command, wherein the second command group comprises a second plurality of commands for execution by the execution unit of the memory controller; and
   copying, by the memory controller, the second command group into the command area of the first data structure;
   wherein the execution unit of the memory controller executes the second plurality of commands after the first plurality of commands of the first command group has finished being executed.

4. The method of claim 2, wherein a first command group of a second data structure comprises a third plurality of commands; and
   wherein the execution unit of the memory controller executes the first plurality of commands of the first command group of the first data structure in parallel with the third plurality of commands of the first command group of the second data structure.

5. The method of claim 1, further comprising initializing the first data structure to an idle state.

6. The method of claim 5, further comprising transitioning the first data structure from the idle state to a new command received state when the host command is received.

7. The method of claim 6, further comprising transitioning the first data structure from the new command received state to a ready for execution state when the first command group is copied into the command area of the first data structure.

8. The method of claim 7, further comprising transitioning the first data structure from the ready for execution state to a first command group complete state when the at least one command of the first command group is executed.

9. The method of claim 8, further comprising transitioning the first data structure to an error state when the execution unit of the memory controller cannot execute the at least one command of the first command group.

10. The method of claim 9, further comprising initializing a second data structure when the execution unit of the memory controller cannot execute the at least one command of the first command group.

11. A memory controller comprising:
    a controller module configured to:
    provide a plurality of data structures, each data structure comprising:
    a host command area;
    a command area; and
    a notes area;
    receive a host command from a host in communication with the memory controller;
    copy the received host command into the host command area of a first data structure;
    generate a first command group in response to the received host command, wherein the first command group comprises at least one command for execution; and
    copy the first command group into the command area of the first data structure; and;
    an execution unit configured to execute the at least one command of the first command group.

12. The memory controller of claim 11, wherein the first command group comprises a first plurality of commands; and
    wherein the execution unit of the memory controller is further configured to execute the first plurality of commands of the first command group in parallel.

13. The memory controller of claim 12, wherein the controller module of the memory controller is further configured to:
    generate a second command group in response to the received host command, wherein the second command group comprises a second plurality of commands for execution by the execution unit of the memory controller; and
    copy the second command group into the command area of the first data structure; and
    wherein the execution unit of the memory controller is further configured to execute the second plurality of commands after the first plurality of commands of the first command group has finished being executed.

14. The memory controller of claim 12, wherein a first command group of a second data structure comprises a third plurality of commands; and
    wherein the execution unit of the memory controller is further configured to execute the first plurality of commands of the first command group of the first data structure in parallel with the third plurality of commands of the first command group of the second data structure.

15. The memory controller of claim 11, wherein the controller module of the memory controller is further configured to initialize the first data structure to an idle state.

16. The memory controller of claim 15, wherein the controller module of the memory controller is further configured to transition the first data structure from the idle state to a new command received state when the host command is received.

17. The memory controller of claim 16, wherein the controller module of the memory controller is further configured to transition the first data structure from the new command received state to a ready for execution state when the first command group is copied into the command area of the first data structure.

18. The memory controller of claim 17, wherein the controller module of the memory controller is further configured to transition the first data structure from the ready for execution state to a first command group complete state when the at least one command of the first command group is executed.

19. The memory controller of claim 18, wherein the controller module of the memory controller is further configured to transition the first data structure to an error state when the execution unit of the memory controller cannot execute the at least one command of the first command group.

20. The memory controller of claim 19, wherein the controller module of the memory controller is further configured to initialize a second data structure when the execution unit of the memory controller cannot execute the at least one command of the at least one first command group.

\* \* \* \* \*